United States Patent [19]
Bernot

[11] Patent Number: 5,189,591
[45] Date of Patent: Feb. 23, 1993

[54] ALUMINOSILICATE GLASS PRESSURE TRANSDUCER

[75] Inventor: Anthony J. Bernot, Gilbert, Ariz.

[73] Assignee: Allied-Signal Inc., Morris Township, Morris County, N.J.

[21] Appl. No.: 898,057

[22] Filed: Jun. 12, 1992

[51] Int. Cl.$^5$ .............................................. H01G 7/00
[52] U.S. Cl. ..................................... 361/283; 73/724
[58] Field of Search .................. 361/283; 73/718, 724, 73/517 AV; 128/2.05 P

[56] References Cited

U.S. PATENT DOCUMENTS

| 3,838,684 | 10/1974 | Manuel et al. | 128/2.05 P |
| 4,609,966 | 9/1986 | Kuisma | 361/283 |
| 4,716,492 | 12/1987 | Charboneau et al. | 361/283 |

Primary Examiner—Donald Griffin
Attorney, Agent, or Firm—Hugh P. Gortler; Robert A. Walsh

[57] ABSTRACT

A capacitive pressure transducer is made of aluminosilicate glass or any other glass having a low thermal coefficient.

16 Claims, 2 Drawing Sheets

ALUMINOSILICATE GLASS PRESSURE TRANSDUCER

BACKGROUND OF THE INVENTION

This invention relates in general to transducers and in particular to a capacitance pressure transducer.

A capacitance pressure transducer provides a capacitance that varies in proportion to a sensed pressure. As shown in FIG. 1, a basic capacitance pressure transducer 1 includes two parallel plates 2 and 3 whose capacitance is determined by plate separation and dielectric material. A variation in pressure flexes the pressure plate 2 and decreases its separation from the fixed plate 3. The variation in capacitance can be used to change the response of a parallel circuit or to change the frequency of a resonant circuit. The response or frequency is proportional to the sensed pressure.

In certain applications, the capacitance pressure transducer must measure pressure while being subjected to high accelerations and vibrations. Because the pressure plate flexes in response to the accelerations and vibrations, the transducer falsely indicates a change in pressure.

To eliminate error due to vibration and acceleration, the fixed plate is replaced with at least one reference plate. The transducer 4 of FIG. 2 includes a pressure diaphragm 5 and two reference diaphragms 6 and 7. Electrodes on the pressure diaphragm 5 and one reference diaphragm 6 form a pressure capacitance, and electrodes on the reference diaphragms 6 and 7 form a reference capacitance. This transducer 4 is disclosed in U.S. Pat. No. 4,689,999 which is issued to Allied-Signal, Inc., the assignee of the present invention. When the transducer 4 is subjected to a steady-state acceleration or to a vibratory force, the diaphragms 5-7 move in phase. However, when the transducer 4 is subjected to a pressure, only the pressure diaphragm 5 moves. By analyzing the change in reference capacitance and subtracting it from the change in pressure capacitance, an accurate measurement of change in capacitance due solely to pressure is obtained. A ratio of the pressure and reference capacitances can be obtained from the oscillator disclosed in U.S. Pat. No. 4,987,782 which is also issued to Allied-Signal, Inc.

The diaphragms 5-7 and housing 8 of the transducer 4 are made of quartz and are fused together along the dotted lines 9. Resulting is a unitary structure.

However, the quartz has a relatively high thermal elastic coefficient, making it sensitive to temperature variations. The plot of FIG. 3 reveals the error as a percentage of full scale pressure for a temperature cycle between 225° F. and −35° F. ("down"/"up" refers to downside/upside of the temperature cycle). The variations in temperature give false indications of pressure changes because deflections are caused by temperature changes, not pressure changes.

SUMMARY OF THE INVENTION

A pressure transducer according to the present invention is less sensitive to temperature variations. This transducer includes a pressure diaphragm and support means that are made of aluminosilicate glass or any other glass having a low thermal elastic coefficient. The pressure diaphragm and support means are bonded together by a hydrate bond or a glass frit. Electrodes on opposing surfaces of the pressure diaphragm and support means cooperate to form a capacitance.

DETAILED DESCRIPTION OF THE PREFERRED EMBODIMENT

Figure 4:
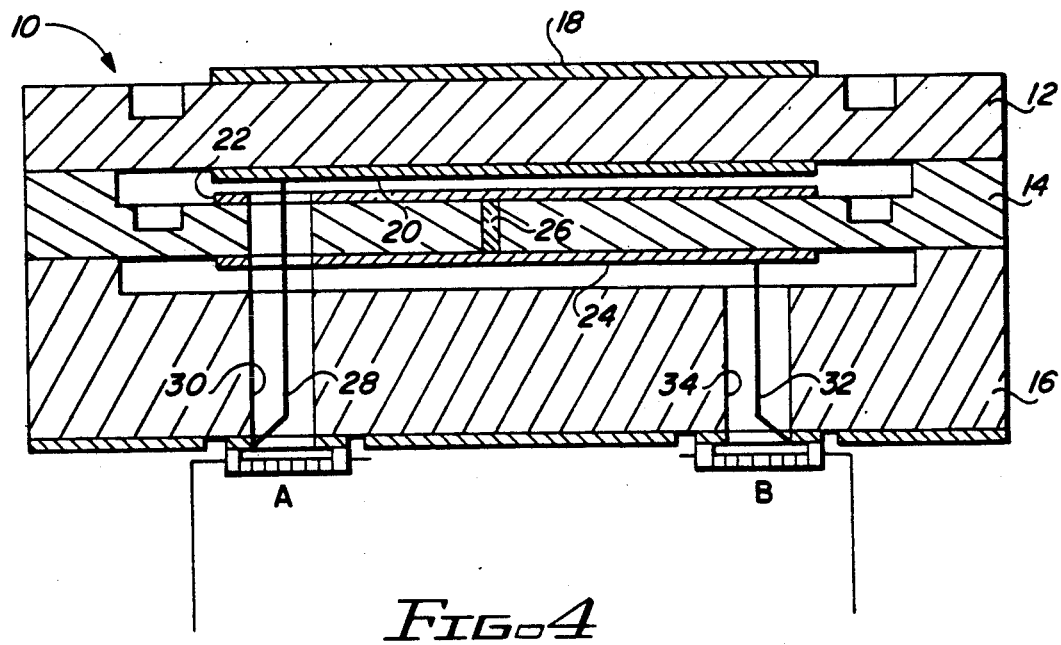
FIG. 4 is a cross-sectional view of a capacitive pressure transducer according to the present invention.
Figure 3:
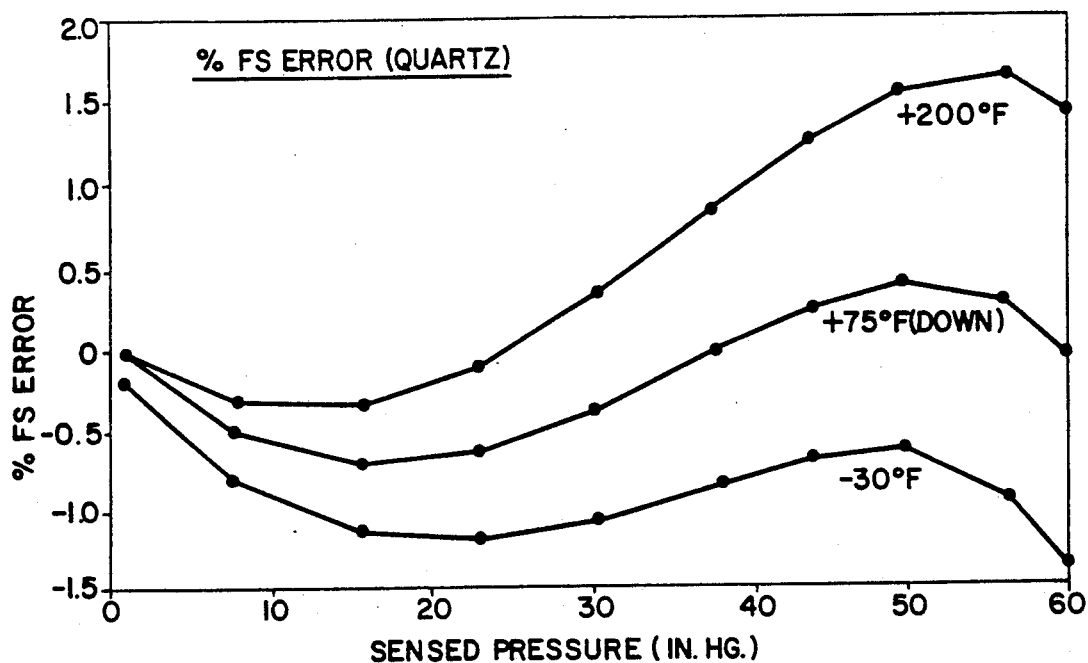
FIG. 3 is a plot of transducer error as a function of temperature and pressure for a quartz pressure transducer similar to that shown in FIG. 2.

FIG. 4 shows a capacitive pressure transducer 10 whose pressure diaphragm 12, compensation diaphragm 14 and support 16 are made of aluminosilicate glass such as Corning #1723. The aluminosilicate glass has a low thermal elastic coefficient (TEC) of −30 ppm/° C. As a result of the low TEC, the diaphragms 12 and 14 exhibit little deflection due to changes in temperature, whereby transducer 10 performance is improved. The TEC of the aluminosilicate glass is fairly constant for temperatures below 400° F. Thus, deflection of each diaphragm 12 and 14 is a linear function of pressure below 400° F. The softening temperature of most aluminosilicate glass is high, thereby making it less susceptible to creep. The aluminosilicate glass also has a thermal expansion between 40 and $50 \times 10^{-7}$, making it easy to hermetically seal to Kovar alloy.

Each diaphragm 12 and 14 is preferably constructed as a disc whose thickness and diameter is such that its first mode of vibration is far in excess of any exciting frequency to which the transducer is subjected. First and second electrodes 18 and 20 are deposited on upper and lower surfaces of the pressure diaphragm 12. The second electrode 20 is employed in a capacitor, but the first electrode 18 is not. Instead, the first electrode 18 prevents the pressure diaphragm 12 from bending during temperature variations. If only one surface of the pressure diaphragm 12 is plated with a deposited metal electrode, the diaphragm 12 will behave like a bimetallic strip and bend slightly when heated or cooled. Thus, the first electrode 18 prevents thermal curvature. It also can serve as a ground plane around the pressure capacitor.

Third and fourth electrodes 22 and 24 are deposited on the upper and lower surfaces of the compensation diaphragm 14. A conductor 26 extending through a passageway in the reference diaphragm interconnects the third and fourth electrodes 22 and 24.

The electrodes 18-24 and conductor 26 are preferably made of a noble metal such as platinum or gold. A thin film of noble metal is sputtered onto the aluminosilicate glass to a thickness between one thousand and two thousand angstroms. For best adhesion, reactive metals such as chrome and titanium are used under the noble metal films. Geometry of the electrodes 18-24 is circular. All electrodes 18-24 must have the same physical characteristics. If, for example, the first and second electrodes 18 and 20 are thicker than the third and fourth electrodes 22 and 24, the diaphragms 12 and 14 will bend differently. But because the electrodes 18-24 are thin, the bending is minimal.

The pressure and compensation diaphragms 12 and 14 are bonded together such that the second and third electrodes 20 and 22 form a capacitor. A cavity is etched into the compensation diaphragm to a depth that establishes the spacing between the second and third electrodes 20 and 22. The bond is formed by hydrate bonding or glass fritting, which processes are well known to those skilled in the art of pressure sensors.

The lower surface of the compensation diaphragm 14 is hydrate bonded or glass fritted to the upper surface of the support 16. Etched into the support 16 is a cavity, which allows the compensation diaphragm 14 to deflect when the transducer 10 is accelerated and/or vibrated. The support 16 should be roughly five times as thick as the pressure diaphragm 12. It is mounted onto a pressure vessel or printed wiring board by a silastic material such as RTV silicone or polythioether. The support 16 serves the function of sealing terminals A and B and buffering the stresses associated with mounting the transducer 10.

When pressure is applied to the pressure diaphragm 12, it deflects towards the compensation diaphragm 14. This deflection decreases the distance between the second and third electrodes 20 and 22, thereby changing the capacitance formed by the second and third electrodes 20 and 22. However, when the transducer 10 is vibrated or accelerated, the pressure and compensation diaphragms 12 and 14 move in unison. Because the second and third electrodes 20 and 22 also move in unison, the capacitance does not change.

To provide differential pressure measurements, the support 16 can be provided with a seal-off tube (not shown) which allows a reference pressure to be applied to the lower surface of the pressure diaphragm 12. The primary pressure is applied to the upper surface of the pressure diaphragm 12.

Terminals A and B are made of a thermally matched metal. Terminal A is connected to the second electrode 20 by a thin wire 28 extending through the support 16, compensation diaphragm 14 and third and fourth electrodes 22 and 24. A first passageway 30 accommodates this wire 28. Terminal B is connected to the fourth electrode 24 (and third electrode 22) by a thin wire 32 extending through the support 16. A second passageway 34 accommodates this wire 32. The wires 28 and 32 are extremely fine, such that they do not interfere with movement of the pressure and reference diaphragms 12 and 14. During evacuation, the terminals A and B are sealed to the support 16 by an indium-based solder in a heated vacuum chamber.

Figure 5:
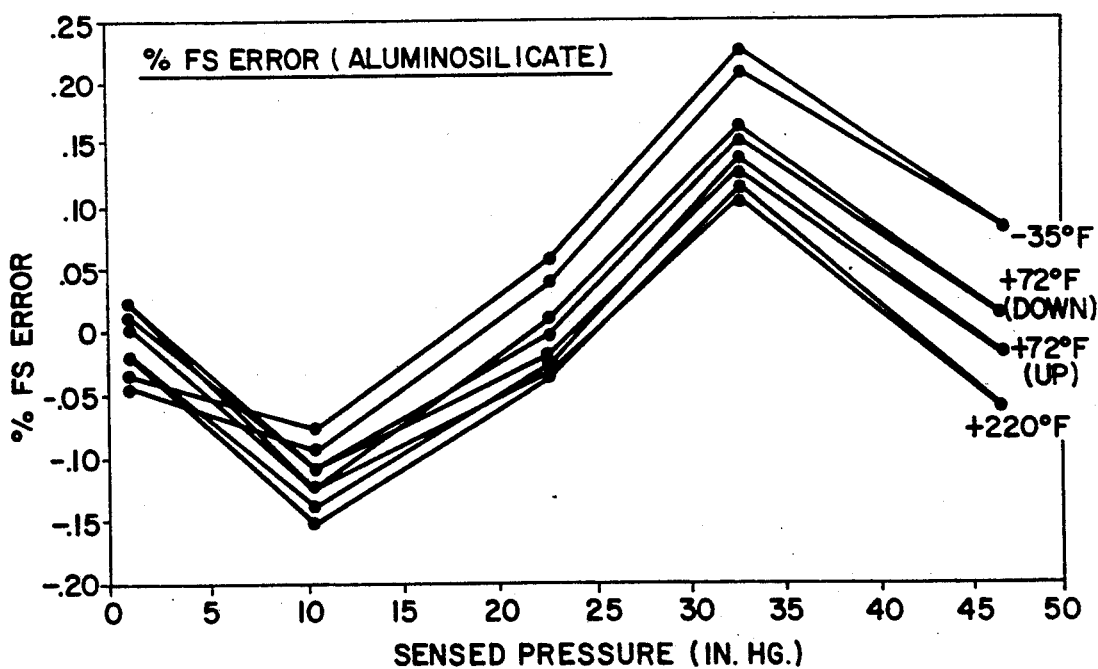
FIG. 5 is a plot of transducer error as a function of temperature and pressure for the aluminosilicate glass pressure transducer shown in FIG. 4.

A transducer 10 made of Corning #1723 was fabricated by hydrate bonding and thereafter tested (see FIG. 5). The temperature sensitivity of this transducer 10 was found to be less than 10% of that of an equivalent quartz transducer.

The transducer 10 can be made of any glass having a TEC between ±30 ppm/° C. One such glass is borosilicate glass such as Schott BK7. Borosilicate crowns have TECs between the 10 and 30 ppm/° C and a Young's modulus that is fairly constant below 400° F. However, borosilicate glass has a lower softening temperature and higher thermal expansion than aluminosilicate glass.

Figure 1:
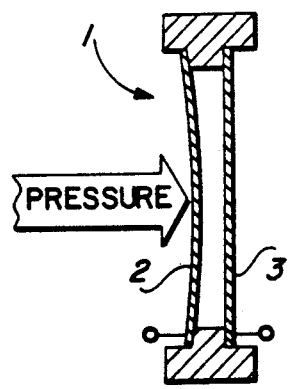
FIG. 1 is a schematic representation of a bending beam capacitive pressure transducer according to the prior art.
Figure 2:
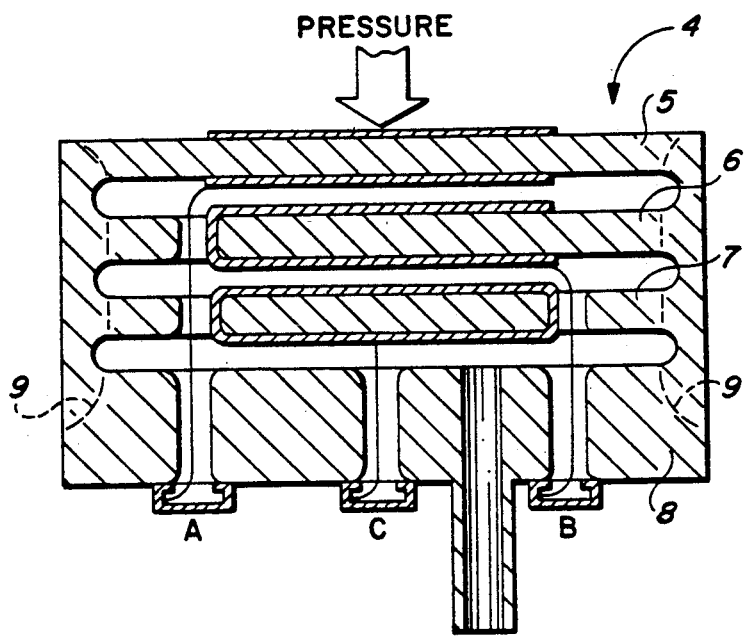
FIG. 2 is a schematic representation of a quartz capacitive pressure transducer according to the prior art.

Although the present invention was described in connection with the transducer shown in FIG. 4, its teachings can be applied to the capacitive pressure transducers shown in FIGS. 1 and 2 as well as any other known capacitive pressure sensor. Other sensors might include vibrating diaphragms or beams, wherein the sensing element depends upon Young's modulus or the bulk modulus of elasticity.

Therefore, it is understood that the embodiment described herein is merely exemplary and that a person skilled in the art may make many variations and modifications without departing from the spirit and scope of the invention. All such modifications are intended to be included within the scope of the invention as defined in the appended claims.

I claim:

1. A capacitive pressure transducer comprising:
    a pressure diaphragm made of glass having a thermal elastic coefficient between ±30 ppm/° C;
    a first electrode on a first surface of said pressure diaphragm;
    support means for supporting said pressure diaphragm, said support means being made of said glass; and
    electrode means, carried by said support means, for providing a second electrode which cooperates with said first electrode to form a capacitor.

2. The transducer of claim 1, wherein said glass is aluminosilicate glass.

3. The transducer of claim 1, wherein said support means includes a fixed plate, and wherein said electrode means is attached to at least one surface of said fixed plate.

4. The transducer of claim 1, wherein said support means also functions to move said second electrode in phase with said pressure diaphragm when said transducer is accelerated or vibrated.

5. The transducer of claim 4, wherein said electrode means includes a support and a compensation diaphragm bonded between said support and said pressure diaphragm, said second electrode being provided on at least one surface of said compensation diaphragm.

6. The transducer of claim 5, wherein said pressure and compensation diaphragms are thin discs having the same thickness and diameter.

7. The transducer of claim 6, wherein said support is at least five times as thick as said pressure diaphragm.

8. The transducer of claim 7, further comprising first and second terminals that are electrically connected to said first and second electrodes, said first and second terminals being made of thermally matched metal.

9. The transducer of claim 8, wherein said electrodes are made of a noble metal.

10. A capacitive pressure transducer comprising:
    a pressure diaphragm made of aluminosilicate glass;
    a first electrode on at least one surface of said pressure diaphragm;
    a reference diaphragm made of aluminosilicate glass;
    a second electrode on at least one surface of said reference diaphragm, said reference diaphragm being bonded to said pressure diaphragm such that said first and second electrodes cooperate to form a capacitor; and
    support means for supporting said diaphragms.

11. The transducer of claim 10, wherein said support means is made of aluminosilicate glass that is bonded to said compensation diaphragm.

12. A method of making a capacitive pressure sensor from segments of aluminosilicate glass, comprising the steps of:
    shaping one of said segments into a pressure diaphragm;

forming a first electrode on at least one surface of said pressure diaphragm;

shaping another one of said segments into a second diaphragm;

forming a second electrode on at least one surface of said second diaphragm; and bonding said pressure and second diaphragms together such that said first and second electrodes form a capacitor.

13. The method of claim 12, wherein said pressure and second diaphragms are hydrate bonded together.

14. The method of claim 12, wherein said pressure and second diaphragms are glass fritted together.

15. The method of claim 12, further comprising the steps of:

forming a support from another segment of aluminosilicate glass; and bonding said support to said second diaphragm.

16. The method of claim 15, further comprising the steps of:

electrically connecting first and second terminals to said first and second electrodes; and soldering said first and second terminals to said support.

* * * * *

UNITED STATES PATENT AND TRADEMARK OFFICE
CERTIFICATE OF CORRECTION

PATENT NO. : 5,189,591
DATED : February 23, 1993
INVENTOR(S) : Anthony J. Bernot It is certified that error appears in the above-identified patent and that said Letters Patent is hereby corrected as shown below:

Col. 2, line 40: after "transducer" insert -- 10 --.

Col. 3, line 61: delete "the".

Claim 5, line 1: change "electrode" to -- support --.

Signed and Sealed this

Thirtieth Day of November, 1993

Attest:

Attesting Officer

BRUCE LEHMAN

Commissioner of Patents and Trademarks